US007574220B2

(12) United States Patent
Purkayastha et al.

(10) Patent No.: US 7,574,220 B2
(45) Date of Patent: Aug. 11, 2009

(54) METHOD AND APPARATUS FOR ALERTING A TARGET THAT IT IS SUBJECT TO SENSING AND RESTRICTING ACCESS TO SENSED CONTENT ASSOCIATED WITH THE TARGET

(75) Inventors: Debashish Purkayastha, Pottstown, PA (US); John Thommana, Cedar Rapids, IA (US)

(73) Assignee: InterDigital Technology Corporation, Wilmington, DE (US)

( * ) Notice: Subject to any disclaimer, the term of this patent is extended or adjusted under 35 U.S.C. 154(b) by 407 days.

(21) Appl. No.: 11/290,101

(22) Filed: Nov. 30, 2005

(65) Prior Publication Data
US 2006/0148418 A1    Jul. 6, 2006

Related U.S. Application Data

(60) Provisional application No. 60/633,527, filed on Dec. 6, 2004.

(51) Int. Cl.
*H04M 1/66* (2006.01)
*H04B 1/38* (2006.01)
*H04W 24/00* (2006.01)
*H04M 1/00* (2006.01)

(52) U.S. Cl. .................. 455/456.1; 455/411; 455/456.2; 455/456.5; 455/456.6; 455/550.1; 455/73

(58) Field of Classification Search .............. 455/66.1, 455/67.11, 67.14, 73–74, 403, 404.2, 410–411, 455/418–421, 423–425, 456.1–456.6, 457, 455/460, 466, 550.1, 556.1–556.2, 557, 561, 455/565, 574; 380/37, 53, 201–203, 241–242, 380/247, 250, 270; 382/305–306, 309, 312–313; 396/433
See application file for complete search history.

(56) References Cited
U.S. PATENT DOCUMENTS
4,473,285 A    9/1984   Winter
(Continued)

FOREIGN PATENT DOCUMENTS
EP      0 505 266       3/1992
(Continued)

OTHER PUBLICATIONS

Mobasseri, "Exploring CDMA for Watermarking of Digital Video", Security and Watermarking of Multimedia Contents, Electronic Imaging'99, San Jose, Jan. 23-29, 1999.
(Continued)

*Primary Examiner*—Meless N Zewdu
(74) *Attorney, Agent, or Firm*—Volpe and Koenig, P.C.

(57) ABSTRACT

A method and apparatus for protecting sensed content and warning a target of sensing is disclosed. A first transceiver, (e.g., a network server), includes a database which defines at least one zone in which sensing a target is not permitted. A second transceiver, (e.g., a cell phone), senses a target to obtain content and temporarily stores the content in a memory, after being encrypted. The cell phone transmits information to the network server which indicates the location of the cell phone. The network server receives the location information from the cell phone and determines whether the target was sensed in a "Do Not Disturb Zone". If so, the network server instructs the cell phone to delete the encrypted content from the memory. Otherwise, the network server indicates to the cell phone that the temporarily stored content may be decrypted, stored in a permanent memory and used as desired.

26 Claims, 2 Drawing Sheets

U.S. PATENT DOCUMENTS

| | | |
|---|---|---|
| 4,490,814 A | 12/1984 | Shenk |
| 4,531,822 A | 7/1985 | Shenk |
| 4,980,671 A | 12/1990 | McCurdy |
| 5,778,304 A | 7/1998 | Grube et al. |
| 5,790,074 A | 8/1998 | Rangedahl et al. |
| 5,848,161 A | 12/1998 | Luneau et al. |
| 5,960,081 A | 9/1999 | Vynne et al. |
| 6,018,374 A | 1/2000 | Wrobleski |
| 6,028,626 A | 2/2000 | Aviv |
| 6,034,726 A | 3/2000 | Hirota et al. |
| 6,111,364 A | 8/2000 | Davis et al. |
| 6,189,146 B1 | 2/2001 | Misra et al. |
| 6,195,772 B1 | 2/2001 | Mielke et al. |
| 6,208,379 B1 | 3/2001 | Oya et al. |
| 6,266,541 B1 | 7/2001 | Noda |
| 6,343,213 B1 | 1/2002 | Steer et al. |
| 6,353,778 B1 | 3/2002 | Brown |
| 6,393,254 B1 | 5/2002 | Pousada |
| 6,396,399 B1 | 5/2002 | Dunlap |
| 6,424,370 B1 | 7/2002 | Courtney |
| 6,441,731 B1 | 8/2002 | Hess |
| 6,477,649 B2 | 11/2002 | Kambayashi et al. |
| 6,529,600 B1 | 3/2003 | Epstein et al. |
| 6,559,883 B1 | 5/2003 | Fancher et al. |
| 6,591,096 B2 | 7/2003 | Ezuriko |
| 6,625,455 B1 | 9/2003 | Ariga |
| 6,662,023 B1 | 12/2003 | Helle |
| 6,677,858 B1 | 1/2004 | Faris et al. |
| 6,687,497 B1 | 2/2004 | Parvulescu et al. |
| 6,711,004 B2 | 3/2004 | Yen et al. |
| 6,738,572 B2 | 5/2004 | Hunter |
| 6,771,946 B1 | 8/2004 | Oyaski |
| 6,832,093 B1 | 12/2004 | Ranta |
| 6,868,229 B2 | 3/2005 | Balogh |
| 6,922,524 B2 | 7/2005 | Sato |
| 7,006,630 B2 | 2/2006 | Yu et al. |
| 7,088,347 B2 | 8/2006 | Iisaka et al. |
| 7,103,369 B2 | 9/2006 | Sato et al. |
| 7,159,116 B2 | 1/2007 | Moskowitz |
| 7,190,808 B2 | 3/2007 | Goldberg et al. |
| 2001/0031631 A1 | 10/2001 | Pitts |
| 2001/0041590 A1 | 11/2001 | Silberfenig et al. |
| 2001/0049275 A1 | 12/2001 | Pierry et al. |
| 2002/0030744 A1 | 3/2002 | Sawachi |
| 2002/0039896 A1 | 4/2002 | Brown |
| 2002/0055361 A1 | 5/2002 | McDonnell et al. |
| 2002/0058497 A1 | 5/2002 | Jeong |
| 2002/0076084 A1 | 6/2002 | Tian et al. |
| 2002/0107032 A1 | 8/2002 | Agness et al. |
| 2002/0177451 A1 | 11/2002 | Ogasawara |
| 2002/0183896 A1 | 12/2002 | Ogure et al. |
| 2002/0186845 A1 | 12/2002 | Dutta et al. |
| 2002/0191102 A1 | 12/2002 | Yuyama et al. |
| 2003/0037237 A1 | 2/2003 | Abgrall et al. |
| 2003/0067392 A1 | 4/2003 | Monroe |
| 2003/0078076 A1 | 4/2003 | Kuwajima et al. |
| 2003/0079166 A1 | 4/2003 | Vermeulen et al. |
| 2003/0122671 A1 | 7/2003 | Jespersen |
| 2003/0132880 A1 | 7/2003 | Hintz |
| 2003/0133573 A1 | 7/2003 | Himmel et al. |
| 2003/0143992 A1 | 7/2003 | Humphrey et al. |
| 2003/0149973 A1 | 8/2003 | Kerlefsen |
| 2003/0169342 A1 | 9/2003 | Steinberg et al. |
| 2003/0179881 A1 | 9/2003 | Nicolas |
| 2003/0191848 A1 | 10/2003 | Hesselink et al. |
| 2003/0212903 A1 | 11/2003 | Porras et al. |
| 2003/0215010 A1 | 11/2003 | Kashiwa |
| 2003/0219231 A1 | 11/2003 | Vernon |
| 2003/0233410 A1 | 12/2003 | Gusler et al. |
| 2003/0235175 A1* | 12/2003 | Naghian et al. ............. 370/338 |
| 2004/0029560 A1 | 2/2004 | Ariga |
| 2004/0046871 A1* | 3/2004 | Ichikawa et al. ....... 348/207.99 |
| 2004/0051853 A1 | 3/2004 | Nishida et al. |
| 2004/0078076 A1 | 4/2004 | Kuwajima et al. |
| 2004/0086089 A1 | 5/2004 | Naidoo et al. |
| 2004/0104844 A1 | 6/2004 | Rooyen et al. |
| 2004/0109081 A1 | 6/2004 | Sumi |
| 2004/0110515 A1 | 6/2004 | Blumberg et al. |
| 2004/0116128 A1 | 6/2004 | Chen |
| 2004/0155969 A1 | 8/2004 | Hayashi |
| 2004/0163118 A1 | 8/2004 | Mottur |
| 2004/0178913 A1 | 9/2004 | Penuela et al. |
| 2004/0198306 A1 | 10/2004 | Singh et al. |
| 2004/0203924 A1 | 10/2004 | Chen |
| 2004/0204021 A1 | 10/2004 | Cocita |
| 2005/0001024 A1 | 1/2005 | Kusaka et al. |
| 2005/0002585 A1 | 1/2005 | Brauckmann et al. |
| 2005/0007456 A1 | 1/2005 | Lee et al. |
| 2005/0008324 A1 | 1/2005 | Balogh |
| 2005/0039020 A1 | 2/2005 | Levy |
| 2005/0043548 A1 | 2/2005 | Cates |
| 2005/0057682 A1 | 3/2005 | Staller |
| 2005/0073419 A1 | 4/2005 | Gary. Jr. |
| 2005/0151669 A1 | 7/2005 | Swallow |
| 2005/0270859 A1 | 12/2005 | Kato |
| 2006/0104483 A1 | 5/2006 | Harel et al. |
| 2006/0148418 A1 | 7/2006 | Purkayastha et al. |
| 2006/0159302 A1 | 7/2006 | Goldberg et al. |
| 2007/0129012 A1 | 6/2007 | Snow |

FOREIGN PATENT DOCUMENTS

| | | |
|---|---|---|
| EP | 0 830 046 | 3/1998 |
| EP | 1 130 500 | 9/2001 |
| EP | 1 139 684 | 10/2001 |
| EP | 1 172 270 | 1/2002 |
| EP | 1 182 901 | 2/2002 |
| EP | 1 379 098 | 1/2004 |
| EP | 1 381 234 | 1/2004 |
| EP | 1 185 923 | 3/2004 |
| EP | 1 445 923 | 8/2004 |
| EP | 1 499 148 | 1/2005 |
| GB | 0 211 612 | 2/1927 |
| GB | 2 329 794 | 3/1999 |
| GB | 2 348 571 | 4/2000 |
| GB | 2 343 339 | 5/2000 |
| GB | 2 348 573 | 10/2000 |
| GB | 2348573 | 10/2000 |
| GB | 2 367 720 | 4/2002 |
| GB | 2 374 986 | 10/2002 |
| GB | 2 393 075 | 3/2004 |
| JP | 2000013497 | 1/2000 |
| JP | 2000032557 | 1/2000 |
| JP | 2000152217 | 5/2000 |
| JP | 2000165952 | 6/2000 |
| JP | 200332890 | 11/2000 |
| JP | 2000332890 | 11/2000 |
| JP | 2003332890 | 11/2000 |
| JP | 2001-116564 | 4/2001 |
| JP | 2001313006 | 11/2001 |
| JP | 2002044736 | 2/2002 |
| JP | 2002125267 | 4/2002 |
| JP | 2002159059 | 5/2002 |
| JP | 2003070058 | 3/2003 |
| JP | 2003143649 | 5/2003 |
| JP | 2003219466 | 7/2003 |
| JP | 2004056769 | 2/2004 |
| JP | 2004088273 | 3/2004 |
| JP | 2004153324 | 5/2004 |
| JP | 2004/242096 | 8/2004 |
| JP | 2004242096 | 8/2004 |
| JP | 2004260631 | 9/2004 |
| JP | 2004260796 | 9/2004 |
| JP | 200503379 | 2/2005 |

| | | |
|---|---|---|
| WO | 98/34412 | 8/1998 |
| WO | 98//34412 | 8/1998 |
| WO | 00/60556 | 10/2000 |
| WO | 02/103968 | 12/2002 |
| WO | 03/028342 | 4/2003 |
| WO | 03/040898 | 5/2003 |
| WO | 03/047207 | 6/2003 |
| WO | 2004/008902 | 10/2004 |
| WO | 2004/08902 | 10/2004 |
| WO | 2004/0089021 | 10/2004 |
| WO | 2004/102313 | 11/2004 |

OTHER PUBLICATIONS

Sanzgiri et al., "A Secure Routing Protocol for Ad Hoc Networks", Proceedings of the 10$^{th}$ IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

Mobasseri, "Exploring Cdma for Watermarking of Digital Video", Security and Watermarking of Multimedia Contents, Electronic Imaging '99, San Jose, Jan. 23-29, 1999..

Sanzgiri et al., "A Secure Routing Protocol for Ad Hoc Networks", Proceedings of the 10th IEEE International Conference in Network Protocols (ICNO '02), IEEE, 2002, pp. 1-10..

Arslanagic, "Personal Firewall in Mobile Phone", Masters Thesis in Information and Communication Technology, Agder University College Faculty of Engineering and Science, Grimstad, Norway, May 2004.

* cited by examiner

METHOD AND APPARATUS FOR ALERTING A TARGET THAT IT IS SUBJECT TO SENSING AND RESTRICTING ACCESS TO SENSED CONTENT ASSOCIATED WITH THE TARGET

This application claims priority from U.S. Provisional Patent Application No. 60/633,527 filed Dec. 6, 2004, which is incorporated by reference as if fully set forth.

FIELD OF INVENTION

The present invention relates to controlling sensing devices embedded in cell phones. More particularly, the present invention relates to a method and apparatus for alerting a target that it is being sensed and restrict unauthorized sensing of the target by such sensing devices.

BACKGROUND

Miniaturization is allowing sensing functionality to be embedded in many devices that previously could not house such functionality. Examples include cameras, microphones, and/or speakerphones, which were previously stand-alone devices, and are now being embedded within telephones, personal digital assistants (PDAs), and watches. The embedding of these devices has turned the cellular telephone from a simple communication tool to an efficient spy mechanism and violator of the personal rights, dignity and freedom of human beings.

Currently this function is being implemented by posting signs that disallow the use of these devices in a specific area. Human beings, (e.g., security guards), may be used to physically locate the presence of these devices and prevent their usage. However, it is very difficult for human beings to police the usage of commonly used articles in crowded areas. The size of these devices allows users not to declare the presence of one or hide it in a fashion not detectable by humans.

There are also existing standalone radio beacon devices that inform devices carrying beacon receivers that the use of the specified devices is prohibited in the vicinity of the beacon. However, the usage of radio beacons has not yet gained immense popularity due to the fact that the beacon reception can be blocked, additional hardware, (not in-line with the cellular hardware roadmap), has to be incorporated into cellular phones to implement such beacons, and can only be used as a "go-no" approach.

Accordingly, it would be desirable to have a method and apparatus that controls the operation of a camera embedded in a cellular phone, using the existing cellular infrastructure, whereby target is alerted that it is being sensed and unauthorized sensing by such sensing devices is restricted.

SUMMARY

The present invention relates to a method and apparatus for protecting sensed content and warning a target of sensing. A first transceiver, (e.g., a network server), includes a database which defines at least one zone in which sensing a target is not permitted. A second transceiver, (e.g., a cell phone), senses a target to obtain content and temporarily stores the content in a memory, after being encrypted. The cell phone transmits information to the network server which indicates the location of the cell phone. The network server receives the location information from the cell phone and determines whether the target was sensed in a "Do Not Disturb Zone". If so, the network server instructs the cell phone to delete the encrypted content from the memory. Otherwise, the network server indicates to the cell phone that the temporarily stored content may be decrypted, stored in a permanent memory and used as desired.

BRIEF DESCRIPTION OF THE DRAWINGS

A more detailed understanding of the invention will be understood from the following detailed description, given by way of example, and in conjunction with the accompanying drawings wherein like elements are designated by like numerals and wherein.

DETAILED DESCRIPTION OF THE PREFERRED EMBODIMENTS

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

The features of the present invention may be incorporated into an integrated circuit (IC) or be configured in a circuit comprising a multitude of interconnecting components.

Figure 1:
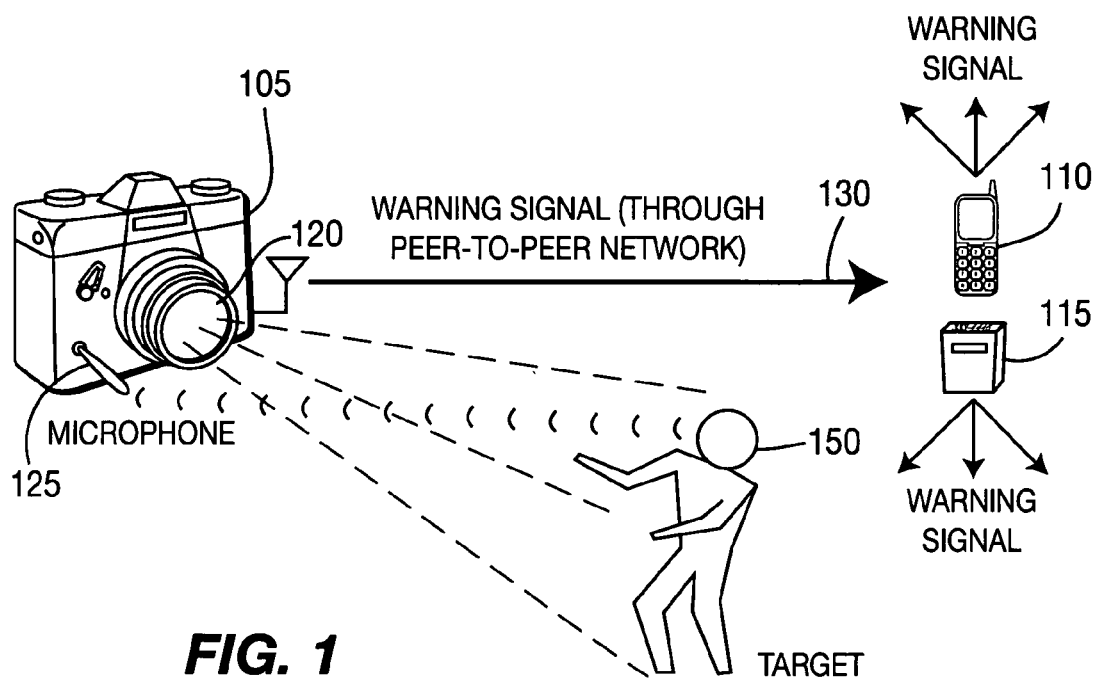
FIG. 1 shows a sensing device transmitting a warning signal through a peer-to-peer network to alert a target that it is being sensed.
Figure 2:
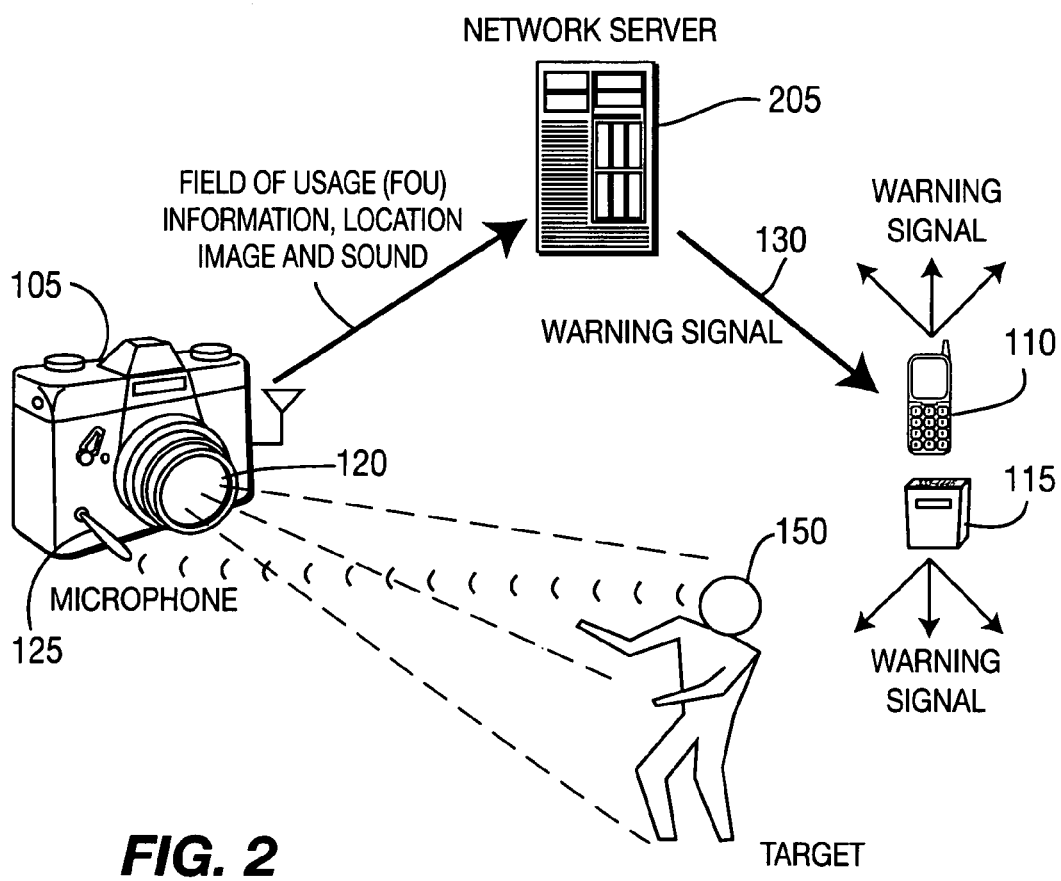
FIG. 2 shows a sensing device transmitting a warning signal via a network server to alert a target that it is being sensed.

In accordance with one embodiment of the present invention illustrated in FIGS. 1 and 2, a network signaling mechanism is used to alert a target that is being sensed, (i.e., audibly and/or optically recorded), by a sensing apparatus 105. It is assumed that the sensing apparatus 105 is embedded in a WTRU.

As soon as the sensing apparatus 105 is activated, the WTRU identifies its own location and creates a field of usage (FOU). The creation of the FOU marks the location boundary of the sensing apparatus in terms of position coordinates. The sensing apparatus 105 may include various sensing devices such as a zoom lens 120 for gathering optical information of a target 150, a microphone 125 for gathering audible information regarding the target 150, or the like. These various sensing devices 120, 125 may be used in determining the FOU.

The sensing apparatus 105 may analyze the location of the target 150 with the help of the FOU. The sensing apparatus attempts to identify if a communication path is available to the target 150. If a direct communication path, as shown in FIG. 1, is available through some form of local, Ad-hoc, peer-to-peer network, it will try to alert the communicating devices, (e.g., cell phone 110, pager 115), associated with the target 150 by sending an electronic warning signal 130.

If a direct communication path is not available, the sensing apparatus 105 sends the FOU information along with the result of analysis, (i.e., location, image, sound), of the target 150 to a network server 205 as shown in FIG. 2. The network server 205 attempts to identify the target 150, which may require the network server 205 having to request information from servers of other operators, personal information databases, or the like.

If the network server 205 is successful in identifying the target 150, the network server 205 sends a warning signal 130 to a communication device associated with the target 150, (e.g., a cell phone 110, a pager 115), to alert the target 150 that is being sensed. If the target 150 is not carrying any communication device, the network server 205 may send the warning signal 130 to other devices associated with the target 150. If the network server 205 is unable to identify the target 150, the network server 205 may initiate a procedure for broadcasting a warning signal in the vicinity of the target, (i.e., the FOU).

Figure 3:
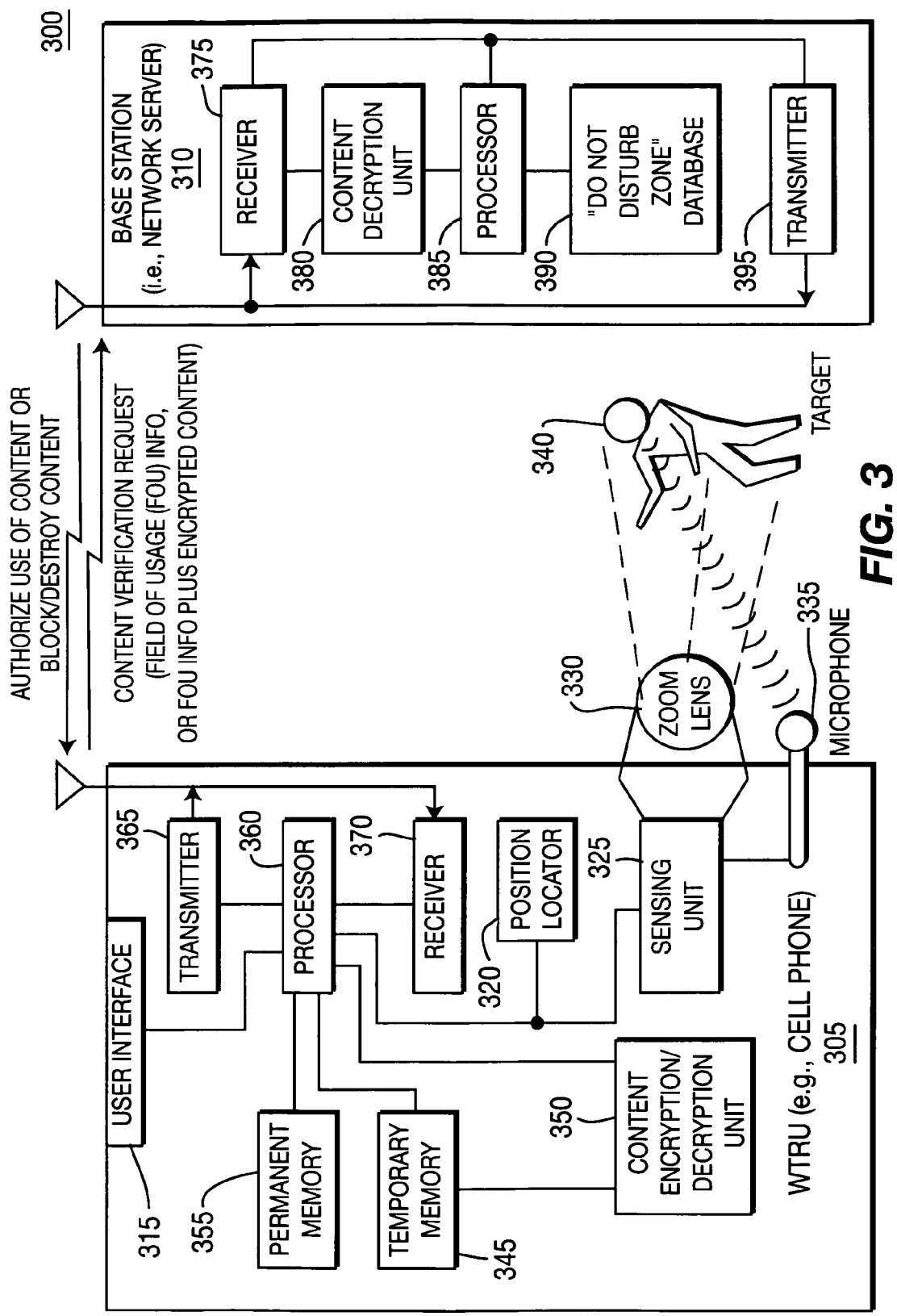
FIG. 3 shows a wireless communication system including a WTRU and a base station which determines whether a sensing unit in the WTRU which obtains sensed content has violated an established "Electronic Do Not Disturb" zone in accordance with the present invention.

FIG. 3 shows a wireless communication system 300 including a WTRU 305, (i.e., cellular phone), and a base station 310, (i.e., server), which determines whether a sensing unit in the WTRU 305 which obtains sensed content has violated an established "Do Not Disturb Zone" in accordance with another embodiment of the present invention. The WTRU 325 includes a user interface 315, a position locator 320, a sensing unit 325 having a zoom lens 330 and a microphone 335 used to sense a target 340, a temporary memory 345, a content encryption/decryption unit 350, a permanent memory 355, a processor 360, a transmitter 365 and a receiver 370. The WTRU 305 is either permitted to, or prohibited from, accessing information that has been obtained by the sensing unit 325. The base station 310 includes a receiver 375, a content decryption unit 380, a processor 385, a "Do Not Disturb Zone" database 390 and a transmitter 395.

The government has mandated that the location of all cellular phones be pin-pointed to within a specified range of accuracy. Currently, most cellular phones have a position locator similar to the position locator 320 in the WTRU 305 built into them. In accordance with the present invention, a "Do Not Disturb Zone" is setup based on information provided by the position locator 320.

A user can define a "Do Not Disturb Zone" via the user interface 315 of the WTRU 305. Via the user interface 315, the user can select one or more sensing devices to gather information on the target 340, such as the zoom lens 330 for recording a single frame, (a picture, such as taken by a camera), or a plurality of picture frames, (i.e., video, such as taken by a video camera), a microphone for recording audio, the position locator 320, or the like. For example, a user that is concerned about his/her privacy in an area may select sensing devices located in that area, such as a photographic camera used by X and a microphone used by Y. This selection of sensing device allows sensing to be selectively blocked, (e.g., allow recordings by an audio recorder, but not by a video recorder).

Furthermore, the user may also define, via the user interface 315, a zone of coverage in various forms to suit the requirement of the moment by providing dimensions. For example, the user can define a zone as a circle around the user with a radius of 10 feet. This textual description, along with the coordinates of the center and dimension of the radius, is sent to the base station 310 for processing and enforcing privacy rules associated with the zone.

The user may also select a power save criteria to determine how often the WTRU 305 will update its mobility information to the base station 310. As previously described, the user can describe the zone where the privacy rules defined by the user will be enforced. But as the user is moving, the coordinates (in context of the previous example it is the center of the circle), of the zone might change slowly or fast depending on user mobility. Since this is maintained by the base station 310, the WTRU 305 has to update the base station 310 about the changing coordinates on a regular basis. The updates may be performed in real time if the user is moving fast, or not in real time if the user is moving slowly. These updates might cost battery power. Thus, the frequency of such updates should be limited to conserve power. Alternatively, new coordinates are sent less frequently and a certain amount of approximation may be used at the network side. The base station 310 may predict the next location, depending on the velocity and the direction the user is moving at.

Once the user defines the "Do Not Disturb Zone", the WTRU 305 uses the position locator 320 to determine its current location. The WTRU 305 then sends a "Do Not Disturb Zone" request to the base station 310 to be stored in a database 390 using already available standardized mechanisms. For example, the user can create a "Do Not Disturb Zone" by sending an e-mail, short message service (SMS), enhanced messaging service (EMS) or multimedia messaging service (MMS) message, logging onto a website and registering, or any other convenient means of communicating with the base station 310. The description of the "Do Not Disturb Zone" in terms of coordinates, radius, or the like must be conveyed to the base station 310.

As soon as the sensing unit 325 in the WTRU 305 is activated, the WTRU 305 identifies its own location via the position locator 320 and the processor 360 creates FOU information to mark the location boundary in terms of position coordinates. The capabilities of the sensing unit 325, the zoom lens 330 and the microphone 335 may be used in determining the FOU.

FOU is different from the "Do Not Disturb Zone". For example, if a user of a sensing device is trying to sense a target, then FOU is applicable to the user and the "Do Not Disturb Zone" is applicable to the target. The base station 310 receives FOU and "Do Not Disturb Zone" information and either allows or disallows sensing.

Based on the location coordinates, the sensing unit 325 will describe the area under its operational range, which is known as FOU. The area is described in the form of location coordinates x, y associated with a location at which a target may be sensed up to z feet. This determination may be performed using a focusing mechanism in a camera. Next, the angle of the camera's view may be determined based on various specifications of the camera's lens, focusing distance and light conditions. FOU may be configured as a data structure, (i.e., a previously agreed upon XML schema), containing location coordinates, distance, angle, or the like.

The sensing unit 325, through the use of the zoom lens 330 and/or the microphone 335, senses an image and/or records sound of the target 340 and stored the associated content in the temporary memory 345 which stores content that is not authorized for viewing, listening and permanent storage.

In the WTRU 305, the processor 360 receives all content obtained by the sensing unit 325 and all position/location information obtained by the position locator 320. The processor 360 also determines whether a copy of the content should be encrypted by the content encryption/decryption unit 350 prior to being stored in the temporary memory 345. Once it is determined that content in the temporary memory 345 does not violate the privacy rights of any subscribers of the base station 310, the content can be decrypted by the content encryption/decryption unit 350 and sent to the processor 360 for storage in the permanent memory 355. The WTRU 305 may send only the FOU information to the base station 310, or the WTRU 305 may send the FOU information and an encrypted copy of the content to the base station 310.

The receiver 375 in the base station 310 receives and decodes the FOU information, and sends the decoded FOU information to the processor 385. The processor 385 compares the FOU information with the active list of "Do Not Disturb Zones" in the database 390.

If the FOU violates any active "Do Not Disturb Zone", then the transmitter 395 of the base station 310 sends a command signal, (i.e., a message), to the WTRU 305 indicating that the content is not authorized for use and thus the WTRU 305 must not decrypt and/or permanently store the content of the temporary memory 345 in the permanent memory 355. The processor 360 then initiates a process of deleting the unauthorized content stored in the temporary memory 345. If the FOU does not violate any active "Do Not Disturb Zone" listed in the database 390, the base station 310 sends an authorization signal indicating that content is authorized for use, and thus may be decrypted and stored in the permanent memory 355 for further processing.

While the content is in the temporary memory 345, the WTRU 305 may store the content in encrypted form or any other form, which cannot be decoded easily. The temporary memory 345 will also make it difficult for any intruder to access that area and attempt to copy the content.

The processor 360 in the WTRU 305 and/or the processor 385 in the base station 310 determines how many outstanding content verifications to permit the user of the WTRU 305. As content is obtained by the sensing unit 325, the content is first copied in the temporary memory 345. The WTRU 305 then sends a content verification request to the base station. When the content is in the temporary memory 345, the WTRU 305 may not permit any more content verification requests to be sent to the base station 310. Since the requests will form a queue, there will be certain delay in getting a response back from the base station 310.

In one scenario, if the temporary memory 345 is accessible by a user, then the WTRU 305 may not allow any additional sensing by the sensing unit 325 to take place until the first content verification request has been responded to by the base station 310. This is a precautionary measure such that the user of the WTRU 305 is prevented from modifying or copying content residing in the temporary memory 345 until being authorized by the base station 310 to do so.

In another scenario, when the temporary memory 345 is secured, (i.e., non-removable), and inaccessible to users, the WTRU 305 may allow multiple content to be recorded and stored in a queued format in the temporary memory 345. Thus, there may be multiple outstanding content pending verifications for which corresponding responses from the base station 310 are expected. This may be useful in areas where no coverage is available and some content has to be recorded. If use of an external and/or removable memory device is desired, the content is encrypted and stored in an internal non-accessible memory device until authorization is received from the base station 310, after which the content may be copied onto an external removable memory device.

Removable memory devices may include, for example, a memory stick, a universal serial bus (USB) drive attached to a digital camera, a personal data assistant (PDA) or the like. In this context, the WTRU 305 has a temporary memory 345 and a permanent memory 355, which may be a removable memory where the content can be stored. As the sensing unit 325 senses content, the content is encrypted by the content encryption/decryption unit 350 and stored in the temporary memory 345 until authorization is received from the base station 310 to use the content as desired. If the base station 310 authorizes use of the content, the content may be decrypted by the content encryption/decryption unit 350 and moved to the permanent memory 355. If a network connection is not available, the content remains in the temporary memory 345. Once the base station 310 is available and authorizes use of the content, the content is moved to permanent memory 355 or a memory, (e.g., a removable memory), external to the WTRU 305.

The number of outstanding stored contents, (e.g., photographs), is directly dependent on the amount of internal non-accessible storage space available. Since the contents are queued in the temporary memory 345, the number of verification requests that are outstanding due to reasons like network delay and/or unavailability of the network will depend on the size of the temporary memory 345. For example, if the temporary memory 345 can store ten different contents, and the user is located in a zone where a network connection does not exist, then after taking ten photographs, the user may be restricted from taking any more photographs using the sensing unit 325.

In accordance with another embodiment of the present invention, a "Do Not Disturb Zone" feature may be provided as a paid service provided by a third party provider, whereby both FOU information and encrypted content is sent from the WTRU 305 to the base station 310, (i.e., a network server). All new subscribers may be required to provide their photo, calendar, or the like to the base station 310 to verify that the content does not violate the privacy rights of any other subscribers of the base station 310.

Users wishing to subscribe to the "Do Not Disturb Zone" feature preferably have to register with the service provider. While registering, the users may have to provide their credentials, contact information, access to calendar, or the like, for better service. The users may also provide personal privacy policy information. Different network providers may collaborate among each other by exchanging user credentials and privacy policy if user is visiting a foreign network. With the ability to exchange the user's privacy policy across networks, the user's privacy can be better protected. Photographs of the user may also be used to enforce the "Do Not Disturb Zone" feature. In the case of picture or video recording, the network may compare the recorded content against the photograph available to it. Multiple service providers can collaborate to ensure that their users are not violating the privacy rights of any other of their users. In this case, the content may be forwarded to the collaborating service providers for verifying that no rights have been violated.

For example, a user activates an "Do Not Disturb Zone" feature. An intruder takes his WTRU 305 and starts taking pictures using the sensing unit 325. As soon the first picture is taken, the WTRU 305 sends the FOU and encrypted content to the base station 310, which uses the content decryption unit 380 to decrypt the content and uses the processor 385 to compare the content, (i.e., picture), and FOU information, (i.e., location information, angle, or the like), with all entries in the database 390 to determine if there is a match. On finding a match with a privacy entry of the user, the base station 310 will instruct the WTRU 305 to block and destroy the content.

The database 390 on the network side contains information on users who have subscribed to a "Do Not Disturb Zone" service. For example, the user information may include the zone, privacy policy and content associated with the user. The base station 310 uses FOU information, such as the location and range, to search the database 390 for any active "Do Not Disturb Zone" in the same area. With an active "Do Not Disturb Zone", there may be user provided photographs which the base station 310 may use to verify, based on the encrypted content, that the FOU is interfering with a "Do Not Disturb Zone," and thus use of the encrypted content is not authorized.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of protecting sensed content comprising:
   using a transceiver to sense a target to obtain content;
   temporarily storing the content in a first memory within the transceiver;
   the transceiver transmitting information indicating a location of the transceiver;
   determining whether the location indicated by the information is within a zone in which sensing a target is not permitted;
   if the location of the transceiver is within the zone, the transceiver receiving a first command signal instructing the transceiver to delete the content from the first memory; and
   if the location of the transceiver is not within the zone, the transceiver receiving a second command signal instructing the transceiver that the content in the first memory may be used as desired.

2. The method of claim 1 further comprising comparing the location information to information in a "Do Not Disturb Zone" database to determine whether there is a match which indicates that use of the temporarily stored content is not permitted.

3. The method of claim 1 further comprising comparing the location information to information in a "Do Not Disturb Zone" database to determine whether there is not a match which indicates that use of the temporarily stored content is permitted.

4. The method of claim 1 wherein the transceiver is operated by at least one subscriber of a service provider.

5. The method of claim 1 wherein the transceiver is a wireless transmit/receive unit (WTRU).

6. The method of claim 1 further comprising:
   encrypting content sensed by the transceiver before temporarily storing the content in the first memory.

7. The method of claim 1 further comprising:
   in response to the transceiver receiving the second command signal, the transceiver decrypting the content stored in the first memory; and
   the transceiver permanently storing the decrypted content in a second memory.

8. The method of claim 1 further comprising:
   a user using a user interface of the transceiver to define the zone in which sensing a target is not permitted.

9. The method of claim 8 wherein the user selects one or more sensing devices via the user interface to obtain content associated with the target.

10. The method of claim 8 wherein the user indicate the dimensions and configuration of the zone via the user interface.

11. The method of claim 8 wherein the user selects a power save criteria via the user interface to designate how often the transceiver will transmit location information.

12. The method of claim 8 further comprising: the user sending an email requesting that the zone be established.

13. A wireless transmit/receive unit (WTRU) for sensing and protecting sensed content, the WTRU comprising:
    a sensing unit for sensing a target to obtain content;
    a first memory which temporarily stores the content;
    a position locator configured to generate information of a location of the WTRU;
    a transmitter which generates and transmits a content verification request;
    a receiver for receiving a message sent in response to the content verification request;
    a content encryption/decryption unit which encrypts the content sensed by the sensing unit before temporarily storing the content in the first memory, and decrypts the content stored in the first memory if the message indicates that the stored content is authorized for use; and
    a processor for initiating a process to delete the encrypted content if the message indicates that the stored content is not authorized for use.

14. The WTRU of claim 13 further comprising:
    a permanent memory for storing the decrypted content if the message indicates that the content is authorized for use.

15. The WTRU of claim 13 further comprising:
    a user interface used by a user of the WTRU to define a zone in which sensing a target is not permitted.

16. The WTRU of claim 15 wherein the user indicates the dimensions and configuration of the zone via the user interface.

17. The WTRU of claim 13 further comprising:
    a user interface used by a user of the WTRU to select one or more sensing devices to obtain content associated with the target.

18. The WTRU of claim 13 further comprising:
    a user interface used by a user of the WTRU to select a power save criteria to designate how often the WTRU will provide the location information.

19. The WTRU of claim 13 wherein the sensing unit includes a microphone for recording sounds emitted by the target.

20. The WTRU of claim 13 wherein the sensing unit includes a zoom lens for recording images of the target.

21. An integrated circuit (IC) for use in conjunction with a sensing unit which senses a target to obtain content, the IC comprising:
    a first memory which temporarily stores the content;
    a position locator configured to generate information of a location of the sensing unit;
    a transmitter which generates and transmits a content verification request;
    a receiver for receiving a message sent in response to the content verification request;
    a content encryption/decryption unit which encrypts content sensed by the sensing unit before temporarily storing the content in the first memory, and decrypts the content stored in the first memory if the message indicates that the stored content is authorized for use; and
    a processor for initiating a process to delete the encrypted content if the message indicates that the stored content is not authorized for use.

22. The IC of claim 21 further comprising:
    a permanent memory for storing the decrypted content if the message indicates that the content is authorized for use.

23. The IC of claim 21 further comprising:
    a user interface configured to define a zone in which sensing the target is not permitted.

24. The IC of claim 23 wherein the user interface is further configured to indicate the dimensions and configuration of the zone via the user interface.

25. The IC of claim 21 further comprising:
    a user interface configured to select one or more sensing devices to obtain content associated with the target.

26. The IC of claim 21 further comprising:
    a user interface configured to select a power save criteria to designate how often to provide location information.

* * * * *

UNITED STATES PATENT AND TRADEMARK OFFICE
CERTIFICATE OF CORRECTION

PATENT NO. : 7,574,220 B2  
APPLICATION NO. : 11/290101  
DATED : August 11, 2009  
INVENTOR(S) : Purkayastha et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this

Seventh Day of September, 2010

David J. Kappos  
*Director of the United States Patent and Trademark Office*